United States Patent [19]

Oota et al.

[11] 4,214,731

[45] Jul. 29, 1980

[54] BUTTERFLY VALVE

[75] Inventors: Kazunari Oota; Kazuhiro Yamazaki, both of Hirakata, Japan

[73] Assignee: Kubota Ltd., Osaka, Japan

[21] Appl. No.: 892,857

[22] Filed: Apr. 3, 1978

[30] Foreign Application Priority Data

| Apr. 1, 1977 [JP] | Japan | 52-37978 |
| Apr. 1, 1977 [JP] | Japan | 52-37979 |
| Apr. 1, 1977 [JP] | Japan | 52-37980 |

[51] Int. Cl.³ .............................................. F16K 1/226
[52] U.S. Cl. .................................... 251/306; 251/308
[58] Field of Search ................................ 251/306, 308

[56] References Cited

U.S. PATENT DOCUMENTS

| 1,188,462 | 6/1916 | McCormack | 251/306 |
| 3,306,573 | 2/1967 | Trefil | 251/306 |
| 3,314,641 | 4/1967 | Overbaugh | 251/306 |
| 3,341,170 | 9/1967 | Housworth | 251/306 |
| 3,537,683 | 11/1970 | Snell, Jr. | 251/306 |
| 3,782,684 | 1/1974 | Stephens et al. | 251/306 |
| 3,784,157 | 1/1974 | Wenglar | 251/306 |
| 3,790,130 | 2/1974 | Getty, Jr. | 251/306 |
| 3,921,956 | 11/1975 | Hinrichs | 251/306 |
| 4,025,050 | 5/1977 | Manki et al. | 251/306 |
| 4,057,217 | 11/1977 | MacDonald | 251/308 |

*Primary Examiner*—William R. Cline
*Assistant Examiner*—H. Jay Spiegel

*Attorney, Agent, or Firm*—Armstrong, Nikaido, Marmelstein & Kubovcik

[57] ABSTRACT

An annular valve seat comprises an annular elastic seat member of large width formed in its outer periphery with a circumferential groove having an enlarged bottom and a trapezoidal cross section, and an annular metal core substantially conforming to the groove in cross section and fitting in the groove. The seat is fitted to the inner surface of the case of the valve defining a flow passage. When the valve is installed in a piping system with pipe flanges fitting to the valve case at the opposite ends of its flow passage, the opposed pipe flange surfaces hold the opposite side faces of the valve seat in pressing contact therewith to tightly fit the seat to the case. The disk of the valve has stem holding bores each provided with cutouts extending inward axially thereof and also circumferentially of the disk at the upper end of the bore to permit escape of air from the bore. A circumferentially elongated planar contact face is formed on the peripheral portion of the disk where each stem projects from the disk. A similar contact face is formed on the elastic seat member in opposed relation to the contact face on the disk. The disk is turnable from its closed position with decreasing friction between the contact faces.

4 Claims, 10 Drawing Figures

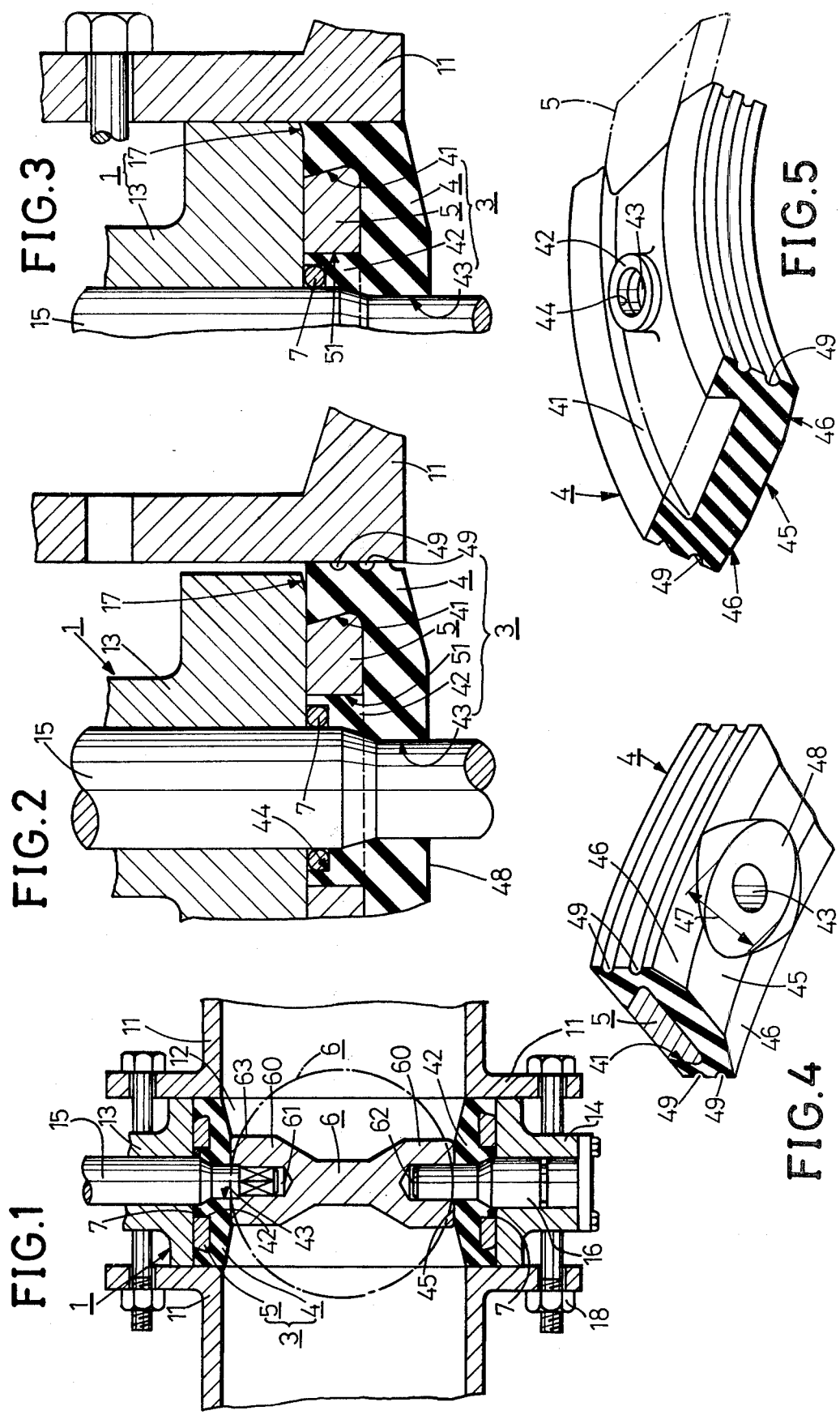

4,214,731

BUTTERFLY VALVE

BACKGROUND OF THE INVENTION

Conventional butterfly valves comprise a case 1, a disk 6, and a seat provided for the disk 6 and including an annular elastic seat member 2 fitting in a groove 10 in the inner periphery of the case 1 and having a metal core 21 embedded therein (see FIGS. 8 to 10). Since the seat member 2 has a width coinciding with the thickness of the valve disk 6, it is difficult to hold the seat member 2 in completely intimate contact with the grooved portion 10 of the case 1 or with the metal core 21, thus frequently permitting air to remain between the seat member 2 and the grooved surface 10 or between the seat member 2 and the metal core 21. Consequently when the fluid flowing through the valve is subjected to negative pressure, the remaining air expands, raising the seat member 2 to cause leakage of the fluid while the valve is closed or damage the seat member. Moreover the valve case and metal core must be rendered resistant to corrosion for use with corrosive fluids.

With many of butterfly valves, the outer periphery of the valve disk made of metal is adapted for pressing contact with the elastic seat member to ensure fluid-tightness. The valve seat is formed with holes 43 diametrically opposed to each other for passing the stems therethrough and with circular planar contact faces 22 centered about the holes 43. Each of the contact faces 22 is adapted for intimate sliding contact with a turning face formed on the valve disk and centered about the stem extending therefrom. Since the contact face 22 on the valve seat is circular, it is maintained in contact with the opposed turning face of the valve disk always over a constant area during the turn of the valve disk. Even while the valve disk is opened, therefore, the opposed contact faces are subject to unnecessary frictional contact which produces wear on the elastic valve seat and reduce the smoothness of disk operation.

SUMMARY OF THE INVENTION

An object of this invention is to provide a butterfly valve comprising a valve case having an inner peripheral surface defining a flow passage therethrough and an annular valve seat including a metal core and fitting to the inner peripheral surface of the case, the valve seat having a width slightly larger than the length of the valve case flow passage, so that when the valve is installed in place, the valve seat is held pressed on its opposite side faces and thereby maintained in completely intimate contact with the case.

Another object of this invention is to provide a butterfly valve of the above-mentioned type in which the valve seat is formed with an elliptical contact face centered about a hole therein for passing each valve stem therethrough, the valve disk being formed on its periphery with an elliptical turning face as opposed to the contact face on the valve seat, so that when the valve disk is turned to open or close the valve, the area of contact between the two opposed faces progressively decreases or increases to thereby reduce unnecessary frictional contact, give a prolonged life to the valve seat and render the valve disk smoothly turnable.

BRIEF DESCRIPTION OF THE DRAWINGS

FIG. 1 is a view in vertical section showing a butterfly valve according to this invention;

FIG. 2 is an enlarged fragmentary view in section showing a valve case with a valve seat fitted therein;

FIG. 3 is an enlarged view in section showing the valve seat in pressing contact with a pipe flange surface;

FIG. 4 is a perspective view showing a contact face on the inner side of the valve seat;

FIG. 5 is a perspective view showing a boss on the outer side of the valve seat;

DETAILED DESCRIPTION OF THE INVENTION

Figure 9:
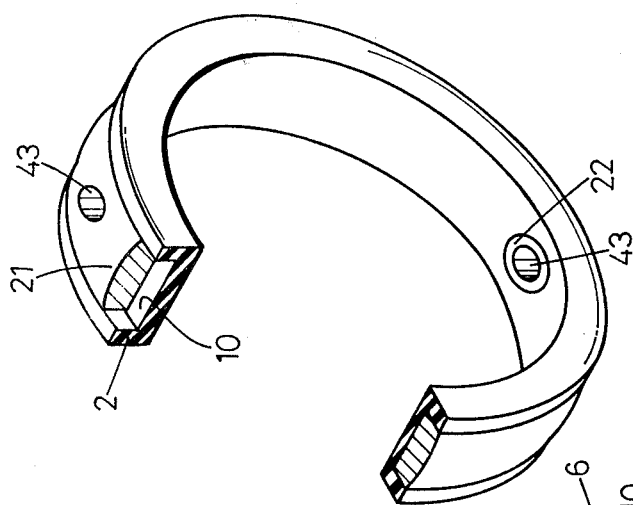
FIG. 9 is a perspective view partly broken away and showing the annular valve seat of the valve.
Figure 8:
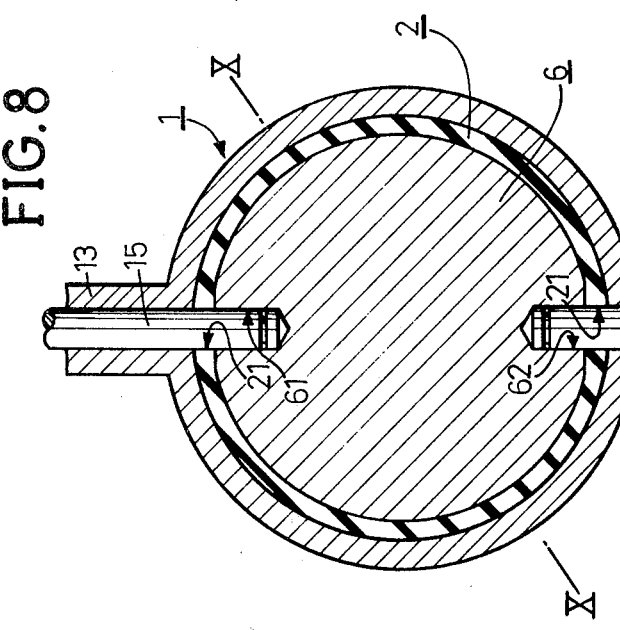
FIG. 8 is a view in vertical section showing a conventional butterfly valve.
Figure 10:
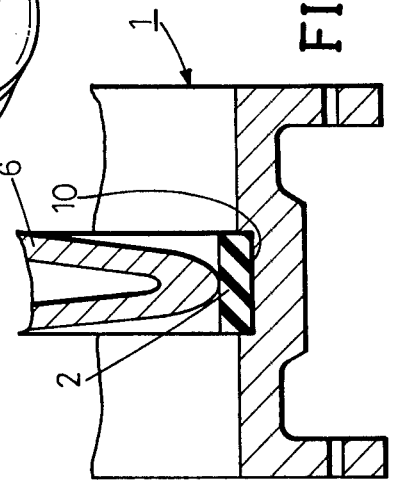
FIG. 10 is a view in section taken along the line X—X in FIG. 8.
Figure 6:
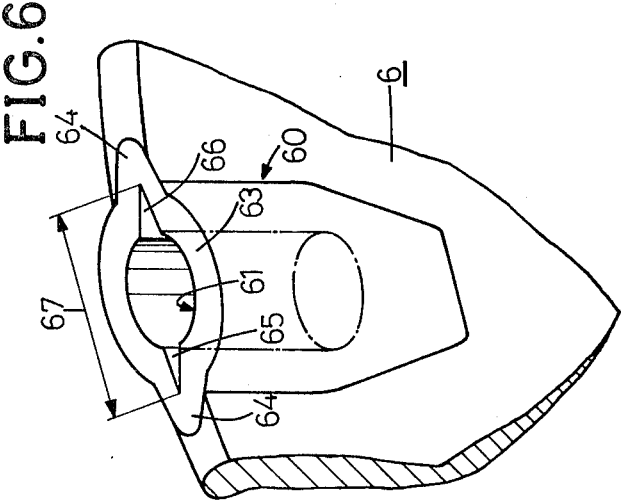
FIG. 6 is a perspective view showing a turning face on a valve disk.

With reference to FIGS. 1 to 7 showing a butterfly valve embodying this invention, a valve case 1 is in the form of a tube of circular cross section as already known. To install the valve in a piping system, pipe flanges 11 fitted to the opposite ends of the case 1 are fastened together by bolts 18 to hold the case between the flanges 11 in pressing contact therewith. The case 1 is provided with a pair of upper and lower bearing tubes 13, 14 diametrically opposed to each other. Valve stems 15, 16 are rotatably supported by the bearing tubes 13, 14 respectively. A valve disk 6 fitting in the case 1 is formed in its upper and lower portions with bores 61, 62 holding the base ends of the valve stems 15, 16. The upper end of the stem 15 extends upward from the bearing tube 13 and is connected to turning means (not shown).

The inner peripheral surface of the valve case 1 has outwardly flaring chamfers 17 at its opposite open ends (see FIGS. 2 and 3). The case 1 has a flow passage 12 defined by the inner surface thereof and receiving therein an annular valve seat 3 according to this invention.

The valve seat 3 comprises an annular seat member 4 of elastic material such as synthetic rubber and an annular metal core 5 having the same outside diameter as the seat member 4 and fitting therein. The outside diameter of the annular seat member 4 is in conformity with the inside diameter of the case 1, i.e. with the diameter of the flow passage 12. The seat member 4 has a width slightly larger than the width of the case 1, namely than the length of the passage 12 and therefore slightly projects outward from the open ends of the case 1.

The elastic seat member 4 is formed in its outer periphery with a circumferential groove 41 defined by a bottom face of increased width and having a substantially trapezoidal cross section. The seat member 4 also has at least one circumferential groove 49 in each of its opposite side faces.

Hollow cylindrical bosses 42 are provided on the outer grooved surface 41 of the seat member 4 as opposed to each other diametrically of the member 4 and positioned where the valve stems 15, 16 extend through the member 4. The top face of each boss 42 is curved along the inner surface of the valve case 1. A hole 43 extends through the seat member 4 and each boss 42 concentrically with the boss. The outer open portion of the hole 43 is provided with a recess 44 concentrically therewith for accommodating an O-ring 7.

The annular elastic seat member 4 is provided on its inner side with a circular valve seat face 45 centrally of its width for intimate contact with the valve disk 6. Formed on the opposite sides of the valve seat face 45 are diametrically outwardly slanting guide faces 46. The valve seat face 45 includes an elliptical contact face 48 centered about the opening of each hole 43 with its short diameter 47 positioned transversely of the member 4 and the long diameter in the circumferential direction thereof. The contact face 48 is planar.

The metal core 5 has a trapezoidal cross section in conformity with the outer peripheral groove 41 of the seat member 4 and is formed with holes 51 in corresponding relation to the bosses 42 on the seat member 4 for receiving the bosses therein.

The valve disk 6 has upper and lower boss portions 60 for holding the valve stems 15, 16 respectively. Each of the boss portions 60 has at its outer end a planar turning face 63 centered about a stem bore 61. The turning face 63 extends circumferentially in opposite directions into extensions 64, such that overall circumferential length of the turning face 63 and the extensions 64 is equal to the long diameter of each of the upper and lower contact faces 48 on the seat member 4. The stem bore 61 in the valve disk 6 is provided with cutouts 65, 66 extending into or formed in the extensions 64. The distance 67 between the outer extremities of the cutouts 65, 66 is slightly longer than the short diameter 47 of the contact face 48.

Operation

To assemble the valve of this invention, the annular valve seat 3 including the seat member 4 with the core metal 5 fitting therein is placed into the flow passage 12 of the valve case 1, with the upper and lower holes 43 in the seat 3 in alignment with the bearing tubes 13, 14 on the case 1. The valve seat 3 in this state projects at its opposite sides from the open ends of the case 1, so that when it is held between and compressed by the pipe flanges 11, the elastic seat member 4 will be elastically deformed into intimate fluid-tight contact with the opposed surfaces of the pipe flanges 11 and with the chamfers 17 on the case 1, with the grooves 49 eliminated from the opposite side faces of the seat member 4.

The metal core 5, fitting in the groove 41 of trapezoidal cross section in the seat member 4, will then be held therein more tightly by the sidewise pressure acting on the seat member 4, whereby the separation of the metal core from the seat member can be prevented.

Figure 7:
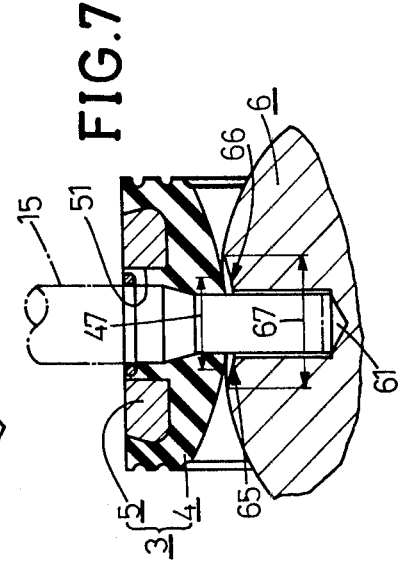
FIG. 7 is a view in section showing the valve disk in its fully opened position.

Subsequently the valve disk 6 in its fully open position relative to the seat 3 is inserted into the flow passage 12 of the valve case 1, with the stem bores 61, 62 in alignment with the holes 43 in the seat 3. In this state, the distance 67 between the outer extremities of the cutouts 65, 66 formed in the disk 6 is longer than the diametrical dimension 47 of the elliptical contact face 48 on the seat 3, with the result that the outer ends of the cutouts 65, 66 are positioned outside the contact face 48 as seen in FIG. 7. Thus the stem bores 61, 62 in the disk 6 communicate with the outside. This permits the air within the bearing tubes 13, 14 to escape through the cutouts 65, 66 when the valve stems 15, 16 are inserted into the bores 61, 62 from above and below the case 1.

The valve stems 15, 16 are smoothly insertable into place, therefore, to complete the valve.

When the valve disk 6 is turned in the valve closing direction during the use of the valve, the circumferential axis of the turning face 63 on the disk 6 approaches the long axis of the contact face 48 on the seat 3 and eventually comes into alignment therewith. In this position, the extensions 64 and turning face 63 are in register with the contact face 48, and the disk 6 is in its fully closed position. The area of contact of the turning face 63 and its extensions 64 with the contact face 48 is the largest when the valve disk 6 is in its fully closed position, giving an improved closure effect, whereas the contact area is the smallest when the disk is in its fully open position. The construction of this invention therefore serves to reduce the undesirable contact between the valve disk 6 and the valve seat 3, thereby giving a prolonged life to the elastic seat member and rendering the valve disk 6 operable with decreased torque.

It is further understood by those skilled in the art that the foregoing description is a preferred embodiment of the disclosed device and that various changes and modifications may be made in the invention without departing from the spirit and scope thereof.

What is claimed is:

1. A butterfly valve comprising a valve case having an inner peripheral surface defining a flow passage therethrough, an annular valve seat fitting to the inner peripheral surface of the valve case and including an annular elastic seat member and an annular metal core fitting to the outer periphery of the seat member, and a valve disk fitting in the annular valve seat and supported at its upper and lower portions by stems extending through holes in the valve seat and held by an upper and a lower portion of the valve case, said holes forming the center of an elliptical planar contact face formed on the inside surface of said annular valve seat and elongated circumferentially of the seat, said valve disk having a stem bore provided with cutouts extending inward axially thereof, said cutouts being positioned in circumferential area around said bore opening, the distance between the outer extremities of said cutouts being slightly longer than the short diameter of said elliptical contact face, the butterfly valve being characterized in that when the valve is installed in a piping system with pipe flanges fitted to the valve case at the opposite ends of its flow passage, the opposed pipe flange surfaces hold the opposite side faces of the valve seat in pressing contact therewith, elastically deforming the seat member into intimate contact with the inner peripheral surface of the valve case.

2. A butterfly valve as defined in claim 1 wherein the elastic seat member is formed in its outer periphery with a circumferential groove defined by a bottom face of increased width and having a substantially trapezoidal cross section, the annular metal core having a trapezoidal cross section and fitting in the groove.

3. A butterfly valve as defined in claim 2 wherein the inner peripheral surface of the valve case is chamfered at each end of the flow passage to provide an outwardly flaring portion, and the elastic seat member is formed with at least one circumferential groove in each of its opposite side faces.

4. A butterfly valve as defined in claim 1 wherein the elastic seat member has a width slightly larger than the length of the valve case flow passage and projects outward from the opposite end faces of the valve case.

* * * * *